United States Patent
Hara et al.

[11] Patent Number: 5,811,679
[45] Date of Patent: Sep. 22, 1998

[54] WHEEL TACHOMETER

[75] Inventors: Tomoyuki Hara; Toshiharu Takasaki, both of Kanagawa-ken, Japan

[73] Assignee: Nissan Motor Co., Ltd., Yokohama, Japan

[21] Appl. No.: 682,074

[22] Filed: Jul. 17, 1996

[30] Foreign Application Priority Data

Jul. 20, 1995 [JP] Japan ................................ 7-183892

[51] Int. Cl.⁶ .................................................. G01P 15/00
[52] U.S. Cl. .................... 73/488; 324/161; 364/424.098; 701/69; 701/54; 701/84; 701/87
[58] Field of Search ........................... 73/488, 514.39, 73/527, 528, 510; 324/160, 164, 166, 167, 178, 179, 161; 364/565, 424.1, 426.01, 426.02, 426.03, 424.098; 303/94, 95, 96, 102, 103; 188/181 R, 181 T, 181 C; 180/197, 233, 247; 701/69, 54, 84, 87

[56] References Cited

U.S. PATENT DOCUMENTS

| | | | |
|---|---|---|---|
| 3,717,384 | 2/1973 | Harned | 303/194 |
| 3,811,056 | 5/1974 | Baba et al. | 327/114 |
| 3,981,545 | 9/1976 | Eddy | 303/139 |
| 3,988,599 | 10/1976 | Fleagle | 327/77 |
| 4,006,417 | 2/1977 | Pace | 324/166 |
| 4,164,872 | 8/1979 | Weigl | 73/510 |
| 4,486,839 | 12/1984 | Mazur et al. | 364/426.015 |
| 4,823,269 | 4/1989 | Fujioka | 364/426.03 |
| 4,846,298 | 7/1989 | Naito | 180/233 |
| 5,000,281 | 3/1991 | Nobumoto et al. | 180/197 |
| 5,183,131 | 2/1993 | Naito | 180/233 |
| 5,320,422 | 6/1994 | Tsuyama et al. | 303/141 |
| 5,376,868 | 12/1994 | Toyoda et al. | 318/587 |
| 5,508,924 | 4/1996 | Yamashita | 364/426.03 |

*Primary Examiner*—Hezron E. Williams
*Assistant Examiner*—Richard A. Moller
*Attorney, Agent, or Firm*—Foley & Lardner

[57] ABSTRACT

A wheel tachometer minimizes variances in the rate of revolution detected by the wheel velocity sensors of the tachometer due to assembling errors and improves the accuracy of the operation of driving force allocation. Sinusoidal wheel velocity signals vF and vR representing the rates of revolution of the front and rear wheels are produced respectively by front and rear wheel revolution sensors are subjected to wave shaping to obtain the rate of revolution of the front wheels nF and that of the rear wheels nR. When the rate of revolution of the front wheels nF and that of the rear wheels nR exceeds an initial threshold value $V_{THMIN}$, the greater one of the rates of revolution nF and nR is used to update the threshold value $V_{TH}$. Thereafter, the detected rates of revolution nF and nR are used for the wheel velocities of the front and rear wheels $V_F$ and $V_R$ when they exceed the threshold value $V_{TH}$ and zero is used for the wheel velocities of the front and rear wheels $V_F$ and $V_R$ when they are lower than the threshold value $V_{TH}$.

4 Claims, 6 Drawing Sheets

ACTUATING HYDRAULIC PRESSURE

FIG.4

COMMAND CURRENT

WHEEL TACHOMETER

BACKGROUND OF THE INVENTION

1. Field of the Invention

This invention relates to a wheel tachometer for detecting the rate of revolution of the wheels of a vehicle on the basis of the value obtained by wheel velocity sensors arranged in the wheel drive power transmission system of the vehicle.

2. Prior Art

Known wheel tachometers of the type under consideration include the ones comprising wheel revolution sensors (hereinafter referred to as wheel velocity sensors) and described in "Handbook on New Model Car (N15-0); Introducing NISSAN Pulser Luccino New Model N15" (Nissan Motor Car, Ltd., January 1995).

Figure 8:
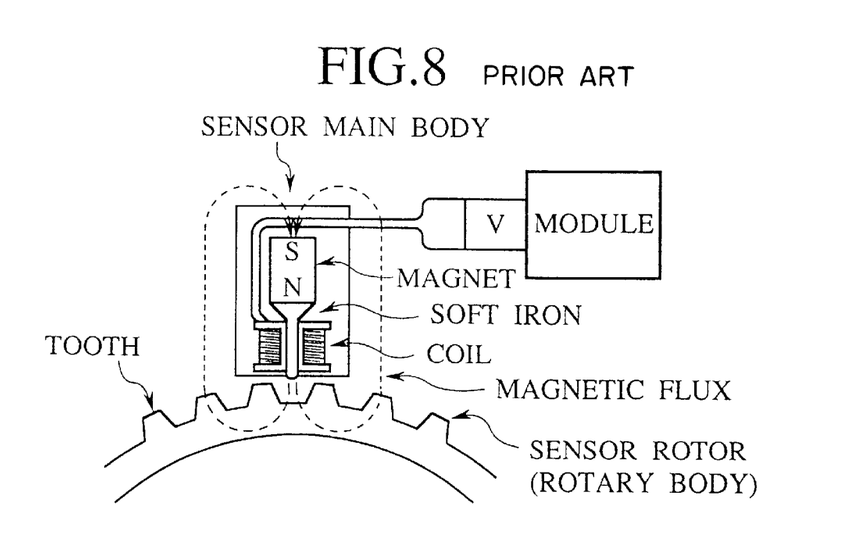
FIG. 8 is a schematic block diagram of a wheel velocity sensor that can be applied to the present invention.

The above wheel velocity sensor comprises a sensor main body arranged in close proximity of the outer peripheral surface of a rotor, which is a cogwheel-like magnetic member designed to rotate in synchronism with the front or rear wheels of the car as shown in FIG. 8. The sensor main body comprises a magnet, a soft iron rod coaxial and integral with the magnet and a coil coaxially arranged around the soft iron rod. The magnet, soft iron rod and coil are rigidly secured to the housing and front end of the soft iron rod is disposed opposite the outer peripheral surface of the rotor with a predetermined gap separating them from each other.

As the rotor is rotated, the magnetic field produced by the magnet through the soft iron rod is modified by the rotor to generate an induced electromotive force. The frequency of the induced electromotive force is proportional to the rate of revolution of the rotor and hence that of the wheels. The induced electromotive force is detected by the wheel velocity sensor and, if the car is of a four-wheel drive type, a sinusoidal voltage signal representing the detected rate of revolution of the wheels is fed typically to the driving force allocation control device of the car. The control device converts the signal into a pulse signal typically by means of a waveform shaping circuit and counts the number of pulses per unit time so that the detected rate of revolution of the wheels is expressed in terms of the number of pulse signals per unit time. For a four-wheel drive type car, the above sensing operation is carried out for both the front and rear wheels and, if the difference between the rate of revolution of the front wheels and that of the rear wheels exceeds a predetermined threshold level, more driving force is allocated to the wheels with the lower rate of revolution.

The induced electromotive force generated by the wheel velocity sensor tends to become undesirably small when the rate of rotation of the rotor is low due to the fact that it is proportional to the rate of change in the magnetic field. Additionally, the induced electromotive force generated by the wheel velocity sensor also tends to become undesirably small when the sensor main body and the rotor are separated by a large gap for some reason or other that may arise in the course of assembling. As the induced electromotive force falls, the driving force control device looses its ability to discriminate the signal representing the output of the wheel velocity sensor from the noise entering the signal system for the operation of converting the detected output signal into a pulse signal. Thus, the noise may be mistaken for the detected output signal of the wheel velocity sensor to produce a false pulse signal representing a wrong rate of revolution of the wheels.

In order to avoid such an undesired situation, there is usually provided a threshold value $S\alpha$ for the signal representing the detected rate of revolution of the wheels that may vary as a function of the noise involved in the signal system so that the rate of revolution of the wheels are detected only when the signal exceeds the threshold value $S\alpha$, whereas the rate of revolution of the wheels is neglected, or regarded to be equal to zero, whenever the signal is under the threshold value $S\alpha$.

If such a threshold value $S\alpha$ is provided, the amplitude of the sinusoidal wave signal representing the rate of revolution of the wheels detected by the wheel velocity sensor is decreased as the gap separating the sensor main body and the rotor increases so that the amplitude of the sinusoidal wave signal that exceeds the threshold value $S\alpha$ of the signal representing the detected rate of revolution of the wheels may vary depending on the wheel velocity sensors of the car. More specifically, the wheel velocity sensors of the car show respective minimum values that are different from each other for the effective rate of revolution of the wheels above which the wheel velocity sensors operate to detect the rate of revolution of the wheels.

In other words, if the front and rear wheels are revolving at a same rate, there may be cases where the wheel velocity sensor for the front wheels detects the actual rate of revolution of the wheels, whereas the wheel velocity sensor for the rear wheels takes the rate of revolution of the wheels for zero because the detected value does not exceed the threshold. Currently, this problem is bypassed by selecting the smallest value of the effective rate of revolution for the threshold value $V_{TH}$ that corresponds to the largest gap between the sensor main body and the rotor and making the sensor become operative only when the rate of revolution detected by the sensor exceeds the threshold value $V_{TH}$ (typically about 4 km/h).

However, if the above described known wheel tachometer is used to control the driving force allocation of a four-wheel drive type car, where an electronically controlled multi-disc clutch is controlled for the seizing power of the clutch by the difference of rate of revolution between the front and rear wheels and the torque is transmitted to the follower wheels, and the geared wheels slip on the ground as the car starts, the wheel tachometer disregards the rate of revolution of the geared wheel until it exceeds the threshold value $V_{TH}$. In other words, the wheel tachometer regards both the rate of revolution of the slipping geared wheels and that of the follower wheels to be equal to zero and consequently no torque is transmitted to the follower wheels so that the car shows a poor starting performance.

If a low threshold value $V_{TH}$ is selected to avoid this problem, there revives the earlier problem of erroneous cases where the wheel velocity sensor for the front wheels detects the actual rate of revolution of the wheels whereas, the wheel velocity sensor for the rear wheels takes the rate of rotation of the wheels for zero because the detected value does not exceed the threshold. Then, the tachometer falsely determines that there is a difference between the rate of rotation of the front wheels and that of the rear wheels and cause to transmit an unnecessary torque to the follower wheels although there is actually no such difference and hence no torque should be transmitted to the follower wheels.

SUMMARY OF THE INVENTION

In view of the above identified problems of known wheel tachometers, it is therefore the object of the present invention to provide a wheel tachometer that is not affected by the difference in the gap separating the sensor main body and the rotor between the sensors of the tachometer and operates accurately even when the car is moving at a low velocity.

According to a first aspect of the invention, the above object is achieved by providing a wheel tachometer characterized in that it comprises a plurality of rate of revolution detecting means, each producing a wheel velocity signal representing the detected rate of revolution of one or more wheels, a detected rate of revolution adopting means for adopting the detected rate of revolution of each of the rate of revolution detecting means only when the wheel velocity signal exceeds a predetermined first threshold value, a threshold value selecting means for detecting the lowest value for each of the rates of revolution of the detected rate of revolution adopting means and selecting the largest one of the detected lower limit values for a second threshold value and a wheel velocity determining means for determining the wheel velocity to be equal to the detected rate of revolution when the rate of revolution adopted by said detected rate of revolution adopting means is greater than said second threshold value and to be equal to zero when the adopted rate of revolution is not greater than the second threshold value.

With a wheel tachometer according to the first aspect of the invention, each of the rate of revolution detecting means produces a wheel velocity signal representing a rate of revolution. The detected rate of revolution adopting means detects the rate of revolution represented by the wheel velocity signal and produces it as the detected rate of revolution only when the wheel velocity signal exceeds a predetermined first threshold value.

Then, a lower limit value is detected for each rate of revolution adopted by the detected rate of revolution adopting means at the time when the vehicle is started and the largest one of the detected lower limit values is selected for a second threshold value. The detected rate of revolution is used when it exceeds the second threshold value, whereas zero is used when the rate of revolution is not greater than the second threshold value.

Thus, the second threshold value represents a value that reflects a situation where all the detected rates of revolution are free from error and also the smallest possible value for the threshold value for the rate of revolution of the vehicle to accommodate any possible assembling errors that may be involved in the rate of revolution detecting means. Therefore, by using the second threshold value that is smallest for accommodating possible assembling errors, the operation of allocating the driving force at a low cruising speed can be carried out accurately and precisely.

According to a second aspect of the invention, said detected rate of revolution adopting means produces a predetermined value for the rate of revolution when said wheel velocity signal is not greater than said first threshold value and said threshold value selecting means has a lower limit detecting means for producing the rates of rotation detected after the output of said detected rate of revolution adopting means has departed from said predetermined value as said lower limit values.

With such an arrangement, the detected rate of revolution adopting means produces a predetermined value when the wheel velocity signal from the rate of revolution detecting means is lower than the first threshold value. More specifically, the detected rate of revolution adopting means produces a predetermined value when the vehicle starts moving and, as the car picks up speed and when the wheel velocity signal from the rate of revolution detecting means exceeds the first threshold value, the rate of revolution represented by the wheel velocity signal is adopted. Thus, a lower limit value is detected for the rate of revolution after the output of the detected rate of revolution adopting means has departed from said predetermined value.

The nature, principle and utility of the invention will become more apparent from the following detailed description when read in conjunction with the accompanying drawings.

DETAILED DESCRIPTION OF THE PREFERRED EMBODIMENT

Now the present invention will be described in greater detail by referring to the accompanying drawings that illustrate a preferred embodiment of the invention.

The embodiment of wheel tachometer according to the invention is applied to a driving force application control apparatus of a four-wheel drive type car that is based on the front engine rear drive (FR) system.

Figure 1:
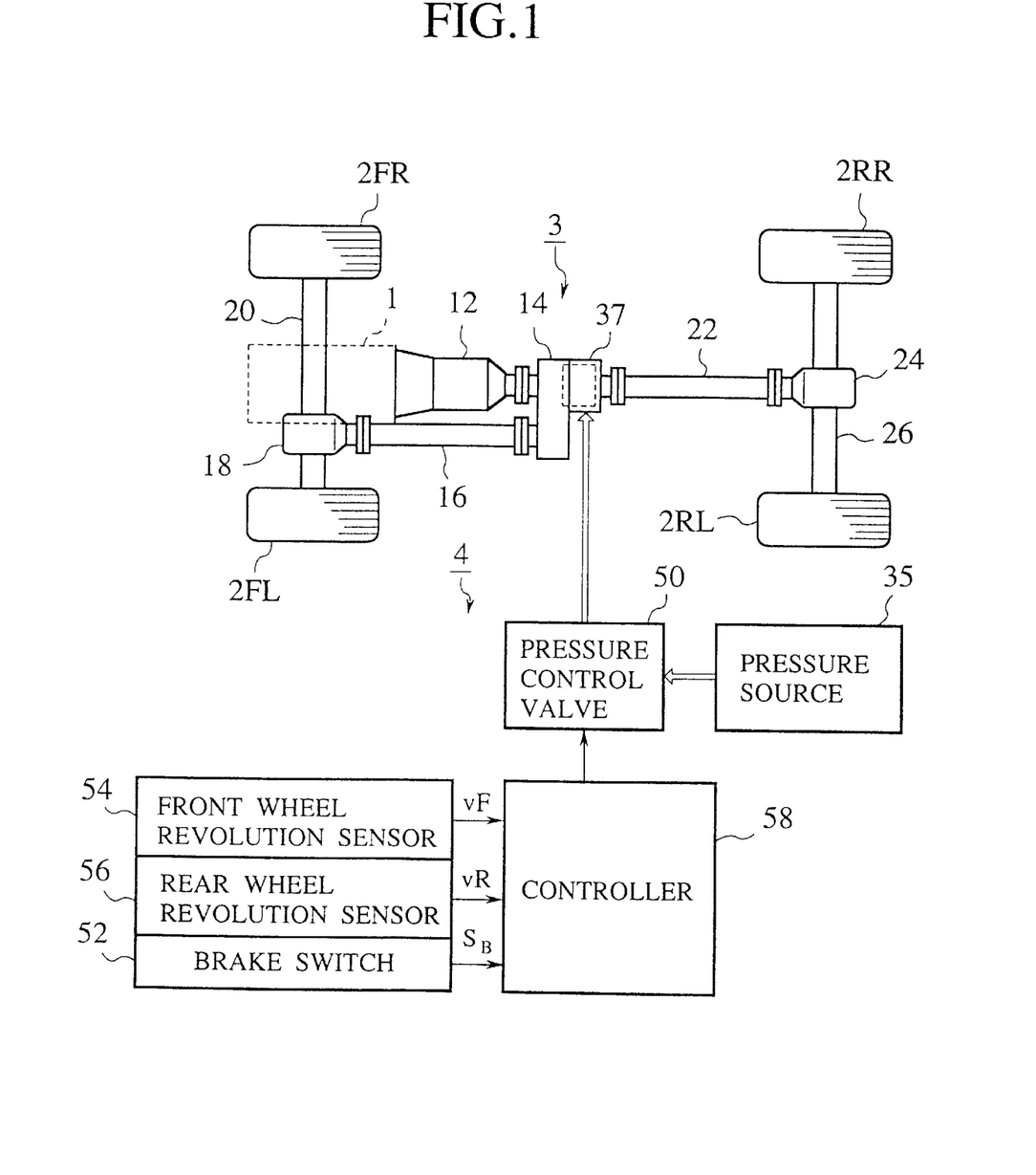
FIG. 1 is a schematic block diagram of an apparatus for controlling the allocation of driving farce to the front and rear wheels, to which a method of setting a wheel velocity according to the invention is applied.

Referring to FIG. 1, there are shown a rotary drive power source 1, which is an engine, wheels including a front left wheel 2FL and a rear right wheel 2RR, a driving force transmission system 3 capable of modifying the allocation of driving force among the wheels 2FL through 2RR and a driving force allocation control apparatus 4 for controlling the allocation of driving force by the driving force transmission system 3. The driving force transmission system 3 comprises a clutch for connecting and disconnecting the transmission of the driving force fed from the engine 1, a velocity change gear 12 for modifying the output of the clutch according to a selected gear ratio and a transferrer 14 for allocating the driving force among the front wheels 2FL, 2FR and the rear wheels (constantly driven wheels) 2RL, 2RR. The driving force transmission system 3 transmits the front wheel driving force allocated by the transferrer 14 to the front wheels 2FL, 2FR by way of a front wheel side output shaft 16, a front differential gear 18 and a front wheel side drive shaft 20 and the rear wheel driving force to the rear wheel 2RL, 2RR by way of a propeller shaft (rear wheel side drive shaft) 22, a rear differential gear 24 and a rear wheel side drive shaft 26.

Figure 2:
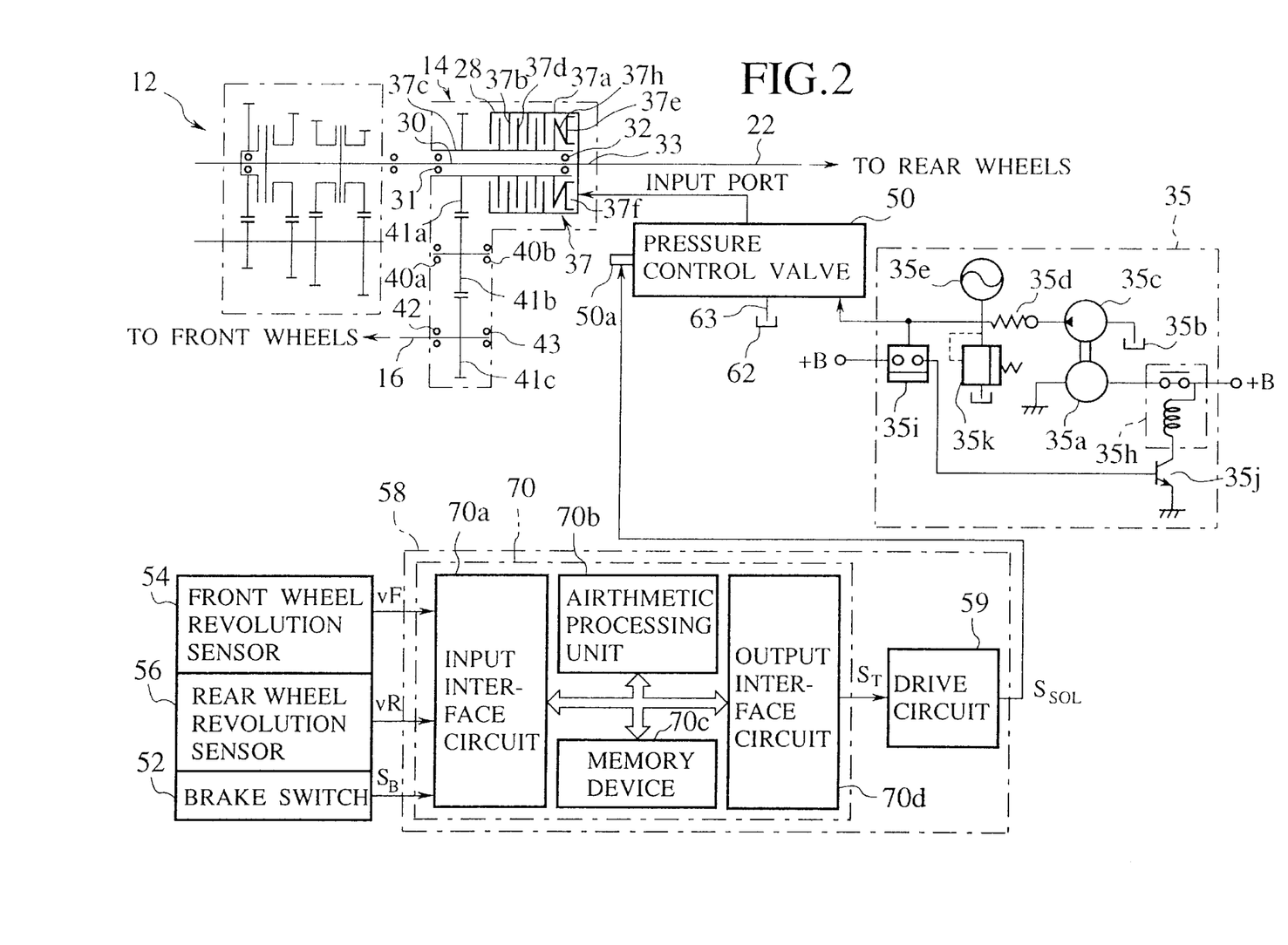
FIG. 2 is a schematic circuit diagram of the apparatus for controlling the allocation of driving force to the front and rear wheels of FIG. 1.

Referring to FIG. 2, the transferrer 14 has an input shaft 30 running through a transferrer case 28 and linked at an end (left end in FIG. 2) to the output of the velocity change gear 12. The input shaft 30 is rotatably borne by a bearing 31 and linked at the opposite end (right end in FIG. 2) to an output shaft 33 rotatably borne by a bearing 32, which output shaft 33 is linked to the propeller shaft 22. The configuration of the transferrer and the transfer clutch, which will be described hereinafter, is described in detail in Japanese Patent Application Laid-Open No. 1-204826 filed by the inventor of the present invention.

A fluid type multi-disc clutch mechanism 37, which is a variable torque clutch capable of modifying the ratio of allocating the torque to the front and rear wheels, is arranged at the middle of the input shaft 30. The clutch mechanism 37 comprises a clutch drum 37a held in mesh with the input shaft 30 by means of spline, a friction plate 37b engaged with the clutch drum 37a in the sense of rotation, a clutch hub 37c rotatably borne on the outer periphery of the input shaft 30 by way of a needle bearing, a friction disc 37d engaged with the clutch hub 37c in the sense of rotation, a clutch piston 37e arranged to a lateral side of the clutch mechanism 37 (to the right in FIG. 2), and a cylinder chamber 37f formed between the clutch piston 37e and the clutch drum 37a. Reference symbol 37h denotes a return spring for the clutch piston plate 37e of the clutch mechanism 37. The clutch mechanism is also linked to the front wheel side of the car by way of a gear train (as shown to the left in FIG. 2). More specifically, the clutch hub 37 is in mesh with a first gear 41a by means of spline and also with a second gear by way of bearings 40a, 40b, which second gear 41a is linked to the front wheel side output shaft 16 by way of a third gear 41c that is rotatable borne by bearings 42, 43.

Figure 3:
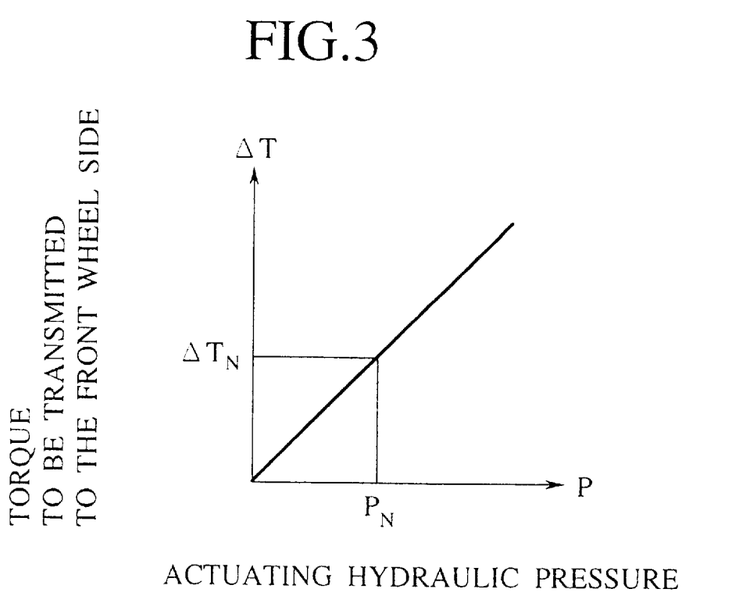
FIG. 3 is a graph showing the relationship between the actuating hydraulic pressure and the torque to be transmitted to the front wheels of the apparatus of FIG. 2.

The transferrer case 28 is provided at a given position on a lateral side thereof with an input port for receiving actuating hydraulic pressure as a command from a pressure control valve 50 of a clutch control unit, which will be described hereinafter, and the actuating hydraulic pressure is applied to the cylinder chamber 37f by way of the input port. Thus, when substantially no actuating hydraulic pressure is applied to the input port and hence the pressure in the cylinder chamber 37f of the clutch mechanism 37 is equal or close to the atmospheric pressure, the friction plate 37b and the friction disc 37d are separated from each other by the resilience of the return spring 37h. Under this condition, all the input torque to be transmitted to the input shaft 30 is forwarded to the rear wheel side by way of the propeller shaft 22 so that only the rear wheels are driven to move the car. When, on the other hand, the input port is subjected to actuating hydraulic pressure, the clutch piston 37e give rise to a pressure that varies as a function of the pressure applied to the cylinder chamber 37f. Consequently, the friction plate 37b and the friction disc 37d engage with each other by friction so that the front wheel driving torque is partly transmitted to the front wheel side by way of the output shaft 16. The torque Δ T transmitted to the front wheel side is expressed by formula (1) below as a linear function of the actuating hydraulic pressure P as typically illustrated in FIG. 3.

$$\Delta T = P \cdot S \cdot 2n \cdot \mu r_m \tag{1}$$

where S is the surface area of the piston 37e for receiving the pressure, n is the number of friction discs, $\mu$ is the coefficient of friction of the clutch disc and $r_m$ is the effective radius for torque transmission of the friction disc. Thus, the torque Δ T to be transmitted to the front wheel side is proportional to the actuating hydraulic pressure P and hence the overall torque is allocated to the front and rear wheels to a ratio that varies as a function of the engagement of the friction plate 37b and the friction disc 37d. The ratio of torque allocation to the front and rear wheels can be continuously varied between 0:100 and 50:50 as a function of the actuating hydraulic pressure P applied to the input port.

Referring again to FIG. 1, the driving force allocation control apparatus 4 comprises a transferrer 14 described earlier, a hydraulic pressure source 35 provided with an oil reservoir 35b for generating hydraulic pressure, a pressure control valve 50 for applying hydraulic pressure to the input port of the fluid type multi-disc clutch mechanism 37 by means of the hydraulic pressure source 35 under a controlled manner, a front wheel revolution sensor 54, a rear wheel revolution sensor 56, the front and rear wheel revolution sensors constituting a rate of revolution detecting means, and a controller 58 for controlling the hydraulic pressure output of the pressure control valve 50 according to the signals of the sensors.

As shown in FIG. 2, the hydraulic pressure source 35 is driven to rotate by an electric motor 35a and comprises an oil pump 35c for pumping up oil from the reservoir 35b and feeding it to the input port of the clutch mechanism 37, a check valve 35d arranged on the discharge side of the oil pump 35c, an accumulator 35e connected to the conduit keeping the check valve 35d and the input port in communication with each other and a relief valve 35k connected to the junction of the accumulator 35e, said pressure control valve 50 being connected between the junction of the accumulator 35e and the input port of the clutch mechanism 37.

The electric motor 35a has an end of its excited winding connected to a positive battery power source B by way of a motor relay 35h and the other end grounded, the motor relay 35h being driven and controlled according to the reading of a pressure switch 35i for detecting the line pressure of the conduit connecting the accumulator 35e and the pressure control valve 50. More specifically, the base of a transistor 35j that operates as a switching regulator is connected to the positive battery power source B by way of the pressure switch 35i and the collector of the transistor is connected to the positive battery power source B by way of the relay coil of the motor relay 35h while the emitter is grounded so that the pressure switch 35i is turned off to bring the switching transistor 35j also into an off-state when the line pressure of the conduit connecting the accumulator 35e and the pressure control valve 50 exceeds a predetermined level. Consequently, the normally open contact t of the motor relay 35h open to deenergize and stop the electric motor 35a and the relief valve 35k relieves any excessive actuating hydraulic pressure of the line above the predetermined level.

When, on the other hand, the line pressure of the conduit connecting the accumulator 35e and the pressure control valve 50 is under the predetermined level, the pressure switch 35i is turned on to bring the switching transistor 35j into an on-state and urge the motor relay 35h to close so that the normally open contact t is consequently closed and the electric motor 35a is energized to rotate and eventually raise the line pressure of the conduit by way of the oil pump 35c. Thus, substantially stabilized actuating hydraulic pressure is fed from the hydraulic pressure source 35 to the primary side of the pressure control valve 50.

The pressure control valve 50 comprises a so-called electromagnetic proportional control type constant secondary pressure reducing valve and a drain pipe 63 is arranged between the drain port of the pressure control valve 50 and a tank 62. The pressure control valve 50 changes the aperture of its spool arranged in the reducing valve as a function of a command current $I_{SOL}$ fed to the proportional solenoid 50a so that the controlled pressure $P_c$ of the clutch mechanism 37 is maintained to a level defined by the command current $I_{SOL}$ regardless of changes in the pressure applied to the primary side, or the input port of the reducing valve. Thus, the actuating hydraulic pressure P applied to the input port of the clutch mechanism 37 is quadratically proportional to the command current $I_{SOL}$ as seen from the graph of FIG. 4.

For the configuration of the electromagnetic proportional control type constant secondary pressure reducing valve, refer to Japanese Patent Application Laid-Open No. 2-68225 by the inventor of the present invention. Note that, neutral torque $T_N$ is used for the torque $\Delta T$ to be transmitted to the front wheel side when the car is moving straight ahead at a constant velocity and neutral pressure $P_N$ is defined as the pressure P applied to the input port of the pressure control valve 50 to provide a driving force allocation ratio of 25:75 for the neutral torque $\Delta T_N$, while neutral command current $I_N$ is defined as the command current $I_{SOL}$ for realizing the neutral pressure $P_N$.

On the other hand, the front wheel revolution sensor 54 and the rear wheel revolution sensor 56 are separately and respectively arranged at positions on the front wheel side output shaft 16 and the rear wheel side propeller shaft 22. Each of them is configured like a known sensor as shown in FIG. 8 to electromagnetically detect the rate of revolution of the related shaft and produces a wheel velocity detection signal vF or vR, whichever appropriate, that represents the detected rate of revolution and is a sinusoidal voltage signal, to the controller 58.

The controller 58 comprises a microcomputer 70 and a drive circuit 59 for controlling the pressure control valve 50. The microcomputer 70 by turn comprises an interface circuit 70a provided with an A/D conversion feature for reading the values of detection signals transmitted from the sensors, an arithmetic processing unit 70b, a memory device 70c, which may be a ROM or RAM and, an output interface circuit 70d provided with a D/A conversion feature for producing a control signal $S_T$ for controlling the engagement of the clutch disc and the clutch plate generated by said arithmetic processing unit 70b. The input interface circuit 70a converts the sinusoidal voltage signals from the front and rear wheel revolution sensors 54 and 56 into respective pulse signals only when the sinusoidal voltage signals exceeds a predetermined threshold value $S\alpha$ (first threshold value) by waveform shaping and count the number of pulses per unit time of each pulse signal so that the detected rate of revolution of the front or rear wheels is expressed in terms of the number of pulse signals per unit time (detected rate of revolution adopting means).

Upon receiving wheel velocity detection signals vF and vR from the front and rear wheel revolution sensors 54 and 56 and a brake signals $S_B$ representing the ON/OFF state of the brake from the brake switch 52, the microcomputer 70 of the controller 58 converts them into pulse signals respectively representing the rate of revolution of the front wheels and that of the rear wheels by waveform shaping and count the number of pulses per unit time of each pulse signal so that it adopts the detected values nF and nR for the front and rear wheel velocities $V_F$ and $V_R$ respectively if the detected rate of revolution of the front wheels nF and that of the rear wheel nR exceeds a predetermined value $V_{TH}$ (second threshold value), whereas it adopts zero for the front and rear wheel velocities $V_F$ and $V_R$ respectively if the detected rate of revolution of the front wheels nF and that of the rear wheel nR are short of the predetermined value $V_{TH}$. At the time of starting the car, it selects either the rate of revolution of the front wheels nF or that of the rear wheels nR, whichever greater than the other, for a new threshold value $V_{TH}$ when both nF and nR exceeds the initial threshold value $V_{THMIN}$.

While the initial threshold value $V_{THMIN}$ may be determined arbitrarily, it typically is the smallest possible value that can be selected for the threshold value $V_{TH}$.

The microcomputer 70 carries out a predetermined processing operation for allocating the driving force on the basis of the selected front and rear wheel velocities $V_F$ and $V_R$, determines the difference between them and calculate the required force T for engaging the clutch disc and the clutch plate and transmits a control signal $S_T$ for obtaining the force T to the drive circuit 59.

The memory device 70c stores programs and fixed data necessary for the processing operation of the arithmetic processing unit 70b and also temporarily stores the output of the latter. The fixed data include tables for the characteristic performances illustrated in FIGS. 3, 4 and 5, of which FIG. 5 is a graph showing the relationship between the difference $\Delta N$ of the front and rear wheel velocities and the torque $\Delta T$ to be transmitted to the front wheel side.

The drive circuit 59 typically comprises a floating type voltage stabilizer designed to convert the control signal $S_T$ from the microcomputer 70 into a command current $I_{SOL}$ for driving the proportional solenoid 50a of the pressure control valve 50. The drive circuit 59 is so arranged as to use the neutral command current $I_N$ for the command current $I_{SOL}$ when the control signal $S_T$ is equal to zero.

Figure 6:
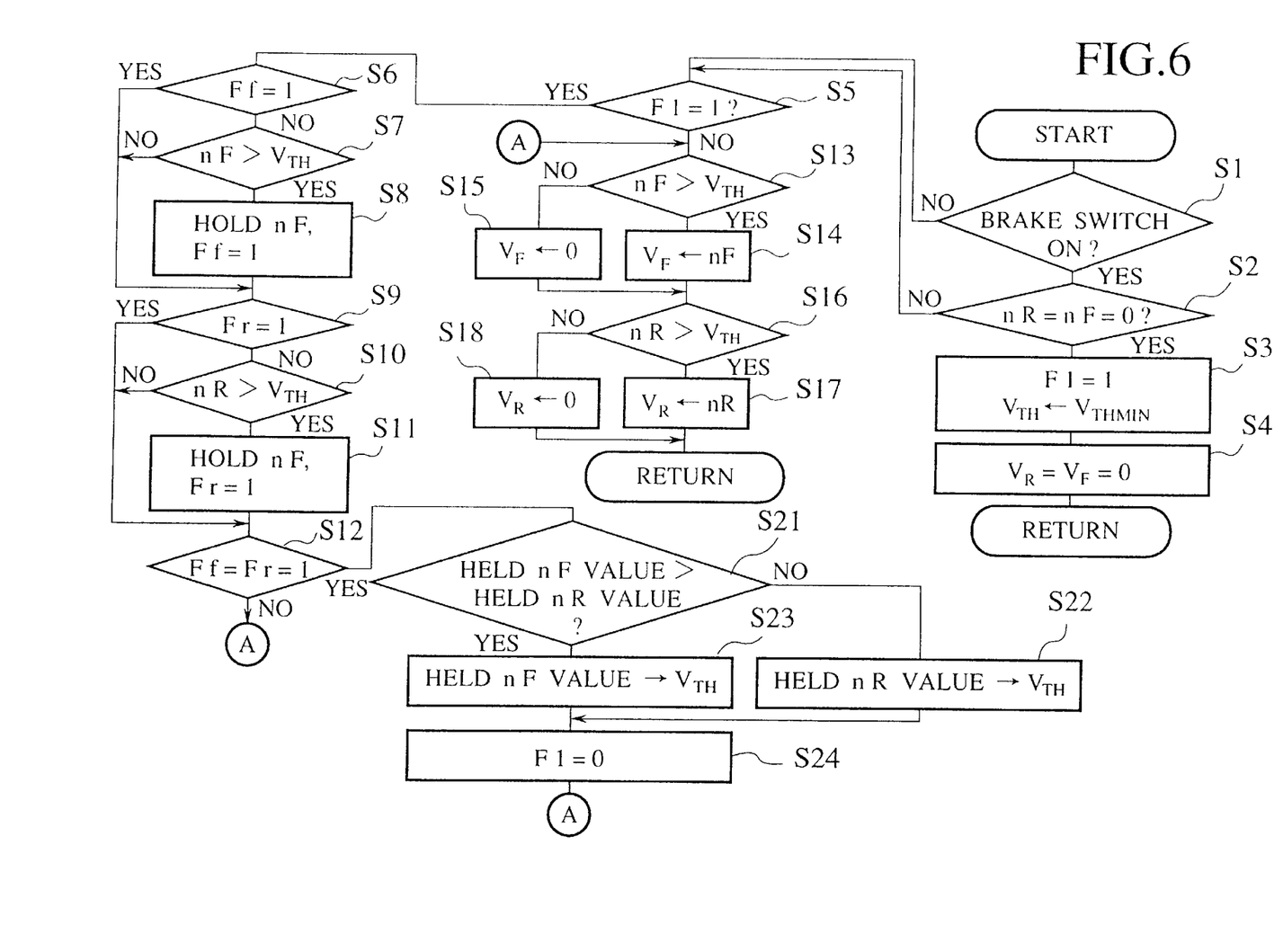
FIG. 6 is a flow chart of the process of determining the wheel velocity by the apparatus of FIG. 2.
Figure 7:
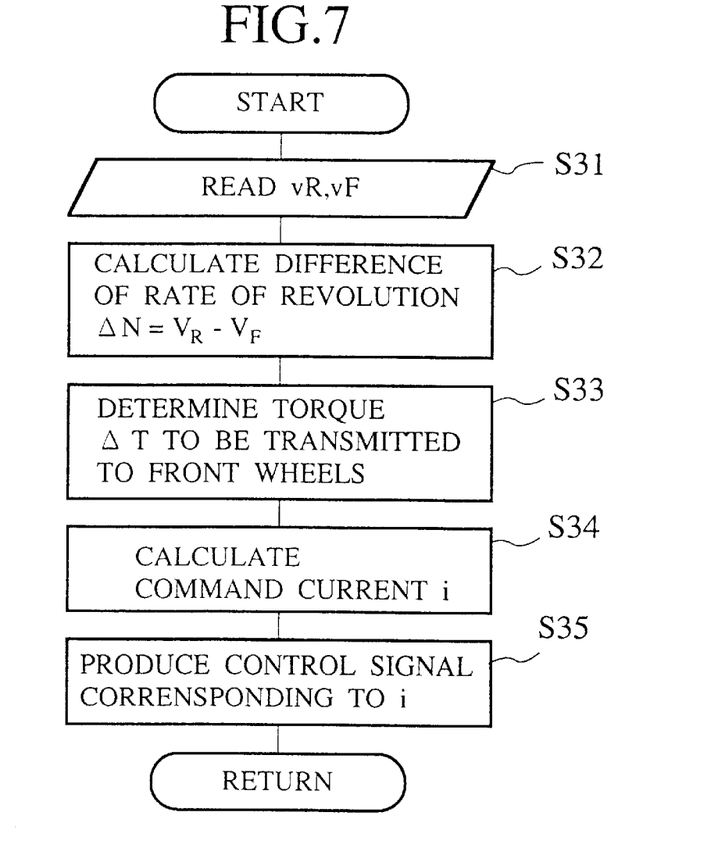
FIG. 7 is another flow chart of the process of determining the wheel velocity by the apparatus of FIG. 2.

Now, the operation of the microcomputer 70 for the above embodiment will be described by referring to FIG. 6 illustrating a processing flow chart for selecting a wheel velocity and FIG. 7 illustrating a processing flow chart for driving force allocation. Note that the above processing operations are typically carried out by way of a timer interrupt that takes place at regular intervals (e.g. 20 msec).

Note also that each of the control flag in the processing operations is initialized to zero.

Assume now that the car is at a complete standstill and the brake pedal is depressed. Then, the brake signal $S_B$ from the brake switch 52 is at ON-state (Step S1). Under this condition, since the wheels are not revolving, no wheel velocity detection signals vF, vR are transmitted to the microcomputer 70 and, therefore, the latter determines that the rate of revolution of the front wheel nF and that of the rear wheels nR are equal to zero (Step S2). Since it can be determined that the car is halted, it sets flag F1 to F1=1 to indicate that the car is at a complete halt and also sets threshold $V_{TH}$ to initial value $V_{THMIN}$ (Step S3). Then, it sets front and rear wheel velocities $V_F$ and $V_R$ to zero and updates the predetermined memory area provided for them (Step S4) before it terminates the operation. The above operation is repeated until the brake signal $S_B$ from the brake switch 52 is turned to OFF-state or until the rate of revolution of the front wheel nF and that of the rear wheels nR coming respectively from the front wheel revolution sensor 54 and the rear wheel revolution sensor 56 are not equal to zero, when the car leaves the halted state.

As the driver of the car release the brake pedal to drive the car to start moving, the brake signal $S_B$ from the brake switch 52 is turned to OFF-state so that the operation moves from Step S1 to Step S5. At this time, since the flag F1 is set to F1=1, the operation moves from Step S5 Step S6.

Since flag Ff indicating that the rate of revolution of the front wheels nF is being held is initially equal to Ff=0, the microcomputer 70 proceeds from Step S6 to Step S7, where it determines if the rate of revolution of the front wheels nF detected by the front wheel revolution sensor 54 is greater than the threshold value $V_{TH}$ or not. Assume here that the threshold value $V_{TH}$ is initialized to the smallest possible value.

The microcomputer 70 then converts the wheel velocity detection signal vF from the front wheel revolution sensor 54 into a pulse signal only when it exceeds the threshold value Sα and counts the number of pulses per unit time to determine the rate of revolution of the front wheels nF. If the rate of revolution of the front wheels nF exceeds the threshold value $V_{TH}$, the microcomputer 70 proceeds to Step S8, where it sets the flag Ff to Ff=1 to hold the rate of revolution of the front wheels nF before it proceeds to Step S9. If, on the other hand, the car is still halted, the microcomputer 70 jumps from Step S7 to Step S9 because the detected rate of revolution of the front wheels nF is equal to zero.

Again, since flag Ff indicating that the rate of revolution of the front wheels nF is being held is initially equal to Ff=0, the microcomputer 70 proceeds from Step S9 to Step S10, where it determines if the rate of revolution of the rear wheels nR detected on the basis of the wheel velocity detection signal vR from the rear wheel revolution sensor 56 is greater than the threshold value $V_{TH}$ or not. If the rate of revolution of the rear wheels nR exceeds the threshold value $V_{TH}$, the microcomputer 70 proceeds to Step S11, where it sets the flag Fr to Fr=1 to hold the rate of revolution of the rear wheels nR before it proceeds to Step S12. If, on the other hand, the car is still halted, the microcomputer 70 jumps from Step S10 to Step S12 because the detected rate of revolution of the rear wheels nR is equal to zero.

As both the flags Ff and Fr are not equal to 1, or Ff=Fr=1 is not true, the microcomputer 70 proceeds to Step S13, where it determines if the rate of revolution of the front wheels nF is greater than the threshold value $V_{TH}$ and, if the former is greater than the latter, it goes to Step S14, where it selects the value for the velocity $V_F$ of the front wheels. If, on the other hand, the former is not greater than the latter, it moves to Step S15, where it selects zero for the velocity of the front wheels, or $V_F=0$. Similarly, the microcomputer 70 determines if the rate of revolution of the rear wheels nR is greater than the threshold value $V_{TH}$ in Step S16 and, if the former is greater than the latter, it goes to Step S17, where it selects the value for the velocity $V_R$ of the rear wheels. If, on the other hand, the former is not greater than the latter, it moves to Step S18, where it selects zero for the velocity of the rear wheels, or $V_R=0$. Then, it updates the predetermined storage area with the front and rear wheel velocities $V_F$ and $V_R$ to terminate the operation.

When the microcomputer 70 carries out another wheel velocity setting operation in the next timer interrupt, it moves from Step S1 to Step S5 because the brake signal $S_B$ is at OFF-state and, since the flag F1 is equal to F1=1, it further moves from Step S5 to Step S6. At this stage, the car picks up velocity so the rate of revolution of the front wheels and that of the rear wheels are increasing. However, assume here that, while the rate of revolution of the front wheels nF can be detected because the wheel velocity detection signal vF from the front wheel revolution sensor 54 exceeds the threshold value Sα, the rear wheel revolution sensor 56 has a large assembling error and the amplitude of the wheel velocity detection signal vR is lower than the threshold value Sα so that the sensor 56 erroneously detects a zero velocity for the rate of revolution of the rear wheels nR. Then, since only the rate of revolution of the front wheels nF is greater than the threshold value $V_{TH}$, the microcomputer 70 proceeds to Step S8, where it sets the flag Ff equal to Ff=1 to hold the detected rate of revolution of the front wheels nF.

As the car further picks up speed, the rear wheel revolution sensor 56 eventually correctly detects the rate of revolution of the rear wheels nR and, when the rate of revolution of the rear wheels nR exceeds the threshold value $V_{TH}$, the microcomputer 70 proceeds from Step S10 to Step S11, where it sets the flag Fr equal to Fr=1 to hold the detected rate of revolution of the rear wheels nR. Thus, as Ff=Fr=1 holds true in Step S12, it moves to Step S21, where it selects the rate of revolution of the front wheels or that of the rear wheels, whichever is greater, for a new threshold value $V_{TH}$ (Steps S22 and S23). Then, in Step S24, it resets the flag F1 to F1=0 and goes to Step S13. Again, it determines if the rate of revolution of the front wheels nF and that of the rear wheels nR are greater than the updated threshold value $V_{TH}$ or not to select respective values for the front and rear wheel velocities $V_F$ and $V_R$ (Steps S13 through S18) before it terminates the operation.

Thereafter, the microcomputer 70 does not update the threshold value $V_{TH}$ but only repeats the Steps S1, S5 and S13 through S18 to select values for the front and rear wheel velocities $V_F$ and $V_R$. When the car comes to a complete halt, or the brake pedal is fully depressed and both the rate of revolution of the front wheels nF and that of the rear wheels nR become equal to zero, the threshold value $V_{TH}$ is updated to the initial value of $V_{THMIN}$. When the car is restarted, the microcomputer 70 repeats the above processing and selects the rate of revolution of the front wheels nF or that of the rear wheels nR both of which have exceeded the threshold value $V_{TH}$, greater, for a new threshold value $V_{TH}$.

It will be understood that Steps S6 through S12 correspond to the lower limit value detecting means, Steps S13 through S18 correspond to the wheel velocity determining means and Steps S21 through S23 correspond to the threshold value determining means.

Then, the microcomputer 70 carries out an operation of allocating the driving force on the basis of the selected front and rear wheel velocities as shown in FIG. 7.

Firstly in Step S31, the microcomputer 70 reads out the front and rear wheel velocities $V_F$ and $V_R$ determined in the above operation and stored in the predetermined storage area and calculates the difference $\Delta N$ of the front and rear wheel velocities $V_F$ and $V_R(V_R-V_F)$ . Then, in Step S32, it determines the torque $\Delta T$ to be transmitted as a function of the difference $\Delta N$ of the front and rear wheel velocities by referring to the stored table for the graph of FIG. 5.

Figure 4:
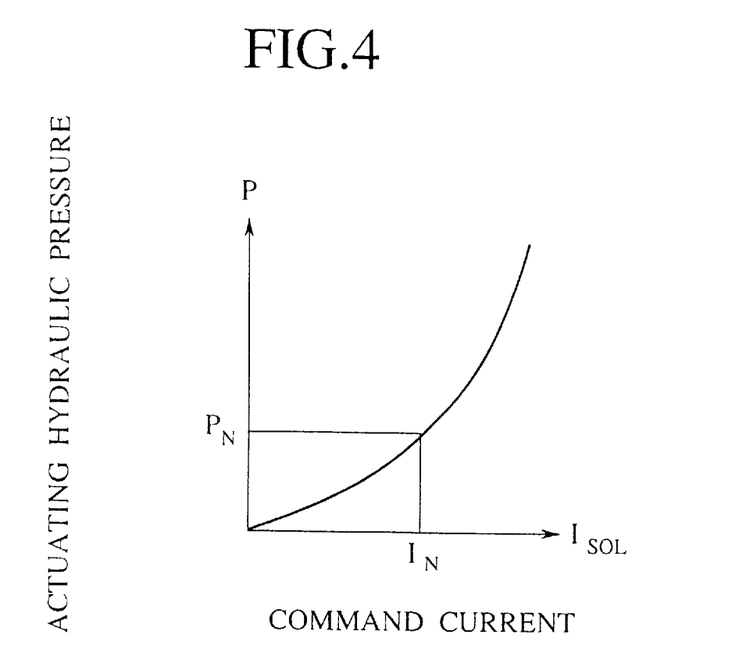
FIG. 4 is a graph showing the relationship between the command current and the actuating hydraulic pressure of the apparatus of FIG. 2.
Figure 5:
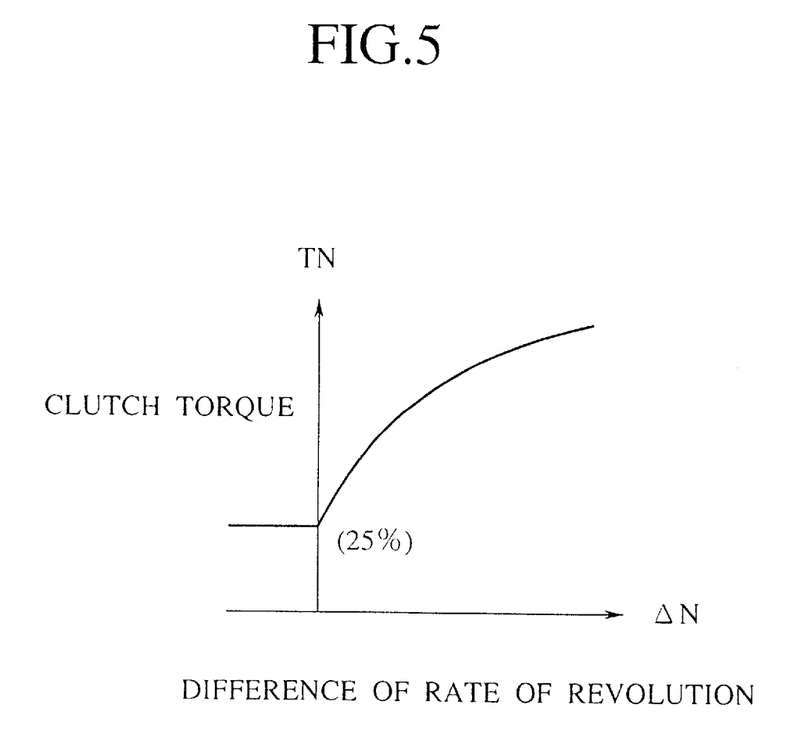
FIG. 5 is a graph showing the relationship between the difference of rate of revolution and the clutch torque of the apparatus of FIG. 2.

Then, in Step S34, the microcomputer 70 calculates the command current $I_{SOL}$ to be fed to the proportional solenoid 50a of the pressure control valve 50 by referring to the stored tables for the graphs of FIGS. 3 and 4.

The microcomputer 70 thereafter moves to Step S35, where it transmits a control signal $S_T$ representing the command current $I_{SOL}$ calculated in Step S34 to the drive circuit 59 by way of the output interface circuit $70_d$.

The drive circuit 59 converts the control signal $S_T$ back to the command current $I_{SOL}$ and feeds it to the proportional solenoid 50a. Thus, the aperture of the spool arranged in the pressure control valve 50 is determined according to the command current $I_{SOL}$ and the controlled pressure $P_C$ on the side of the clutch 37 and hence the force for engaging the friction plate and the friction disc of the clutch are regulated according to the command current $I_{SOL}$.

Therefore, if the driven rear wheels slip when the car is geared to start, Steps S1, S5, S6, S7 and S12 through S18 are repeated because the front wheels do not rotate and the rate of revolution of the front wheels nF remains equal to zero. Under this condition, while the front wheel velocity $V_F$ is determined to be equal to zero because the threshold value $V_{TH}$ is set to the initial value $V_{THMIN}$, the rate of revolution of the rear wheels nR is determined to be equal to the value corresponding to the rear wheel velocity vR after the wheel velocity detection signal vR of the rear wheel revolution sensor 56 exceeds the threshold value Sα, and the rear wheel velocity $V_R$ is determined to be equal to the rate of revolution of the rear wheels nR after the rate of revolution of the rear wheels nR exceeds the threshold value $V_{TH}$.

Thus, in the operation of driving force allocation, the microcomputer 70 realizes that there is a difference of velocity between the front and rear wheels at this point and starts transmitting the driving force to the front wheel side. After the start of the transmission of driving force and when both the wheel velocity detection signal vF of the front wheel revolution sensor 54 and the rate of revolution of the front wheels nF exceed the respective threshold values of Sα and $V_{TH}$, in other words, when the rate of revolution of the front wheels nF takes a value other than zero, the latter is stored as a lower limit value. Thus, as effective lower limit values that are respectively set on the basis of wheel velocity detection signals vF and vR are detected for both the front and rear wheels, these values are compared and the larger one is stored as a new threshold value $V_{TH}$. Thereafter, the new threshold value $V_{TH}$ is used for the operation of selecting a wheel velocity.

Since the threshold value $V_{TH}$ represents an effective lower limit for the rate of revolution of the front wheels and that of the rear wheels, it can be regarded as a value that is not affected by any assembling errors on the part of the wheel velocity sensors. In other words, the threshold value $V_{TH}$ represents an effective lower limit for the rate of revolution of the front wheels and that of the rear wheels that is least subject to variance.

Thus, the operation of allocating the driving force on the basis of the wheel velocities $V_F$ and $V_R$ detected by utilizing the updated threshold value $V_{TH}$ is least affected by assembling errors on the part of the wheel velocity sensors and hence can be very accurate and precise. Differently stated, since the threshold value $V_{TH}$ represents a value that is least affected by any errors, the operation of allocating the driving force is based on the real rates of revolution of the front and rear wheels. For example, if the rear wheels slip when the car is starting, the driving force is allocated in the initial stages of the slip to realize an improved dash.

Assume, for example, that the car is moving at a low speed and the rate of revolution of the front wheels does not show any difference from that of the rear wheels and the front and rear wheel velocity sensors involve assembling errors. Then, the amplitude of the wheel velocity signals coming from the front and rear wheel velocity sensors is also subject to errors so that the wheel velocity detection signal coming from either one of the wheel velocity sensors may represents a zero rate of revolution and the signal coming from the other sensor may correspond to the erroneous signal. However, since the current threshold value $V_{TH}$ represents the larger one of the rate of revolution of the front wheels nF and that of the rear wheels nR, if both of the detected nF and nR are greater than the threshold value $V_{TH}$, they correspond to the respective wheel velocity detection signals so that they are selected for driving force allocation. If, on the other hand, if both of the detected nF and nR are smaller than the threshold value $V_{TH}$, the rate of revolution that is not selected for the threshold value $V_{TH}$ may not correspond to the related wheel velocity detection signal and, therefore, a zero velocity is selected for both the front and rear wheels in the operation of allocating the driving force. Thus, there does not arise any case where only either the rate of revolution of the front wheels or that of the rear wheels is detected and selected for use while the other is regarded to be equal to zero when the car is moving at a low speed that would not give rise to any difference in the rate of revolution.

Thus, any erroneous operation of the car such as tight corner braking at a low cruising speed due to variances in the detected wheel velocity for some reason or other can be avoided by using a wheel tachometer according to the invention.

With the above embodiment, the lowest rate of revolution detected by the wheel velocity sensors is selected for the threshold value $V_{TH}$ for each starting action of the car and the threshold is updated to reflect any changes in the wheel velocity sensors with time to constantly use a correct threshold value.

While the above embodiment is described in terms of a four-wheel drive type car whose rear wheels are principally driven, it is also effective for a four-wheel drive type car based on front wheel drive and also for a two-wheel drive type car.

Again, while the above embodiment is described in terms of electromagnetic type wheel revolution sensors, they may be replaced with optical type sensors to achieve a similar effect.

While a microcomputer is used for controlling the operation of drive force allocation in the above embodiment, it may be replaced by an electronic circuit comprising shift registers and arithmetic circuits.

Again, while the above embodiment is described in terms of a fluid type friction clutch involving hydraulic pressure, it may be replaced by an electromagnetic clutch or a clutch of some other type that can reallocate the driving force in a continuous manner.

While the above embodiment is described in terms of the use of actuator oil as an actuator fluid for urging a variable torque clutch, any other fluid such as a liquid like water or a gas such as air may alternatively be used for the purpose of the invention. The pressure control valve may not necessarily be a reducing valve and a valve of any other type that can feasibly control the secondary side pressure in response to a command can alternatively be used for the purpose of the invention.

The electric motor for driving the oil pump in the above embodiment can be omitted, as the latter may be driven by the engine of the car.

While the rates of revolution of the front and rear wheels are used for the operation of allocating the driving force in the above embodiment, they may alternatively be utilized for controlling an anti-lock brake or some other functional feature of a car.

What is claimed is:

1. A wheel tachometer comprising:
    a plurality of rate of revolution detectors, each associated with a wheel for producing a wheel velocity signal representative of a rate of revolution thereof;
    a rate of revolution adopting unit for adopting the revolution rate detected by each of the revolution rate detectors when the wheel velocity signal exceeds a first threshold value;
    a threshold value selecting means for detecting a lowest value of the adopted rates of revolution detected by each of the revolution rate detectors and selecting a largest one of the adopted lowest values as a second threshold value; and a wheel velocity determining means for determining the revolution rate when the detected rate of revolution exceeds the second threshold value.

2. A wheel tachometer as defined in claim 1, wherein the revolution rate detectors are of a magnetic pick-up type that produces a sinusoidal voltage signal, wherein the frequency thereof varies proportional to the revolution rate.

3. A wheel drive torque allocating device for allocating engine power between a front wheel and a rear wheel in response to a rate of revolution difference therebetween, the device comprising:

first and second sensors, each arranged relative to the front and rear wheels, for producing, respectively, first and second wheel velocity signals of variable frequency, which is proportional to the respective revolution rate of the front and rear wheels;

a rate of revolution adopting unit for adopting the revolution rate detected by each of the first and second sensors when the wheel velocity signal exceeds a first threshold value;

a threshold value selecting unit for detecting a lowest value of the revolution rate that the adopting unit adopts the revolution rate detected from each of the wheels and for selecting a largest one of the adopted lowest values as a second threshold value;

a wheel velocity determining unit for determining the revolution rate for each of the wheels when the detected rate of revolution exceeds the second threshold value;

a calculating unit for calculating a rate of revolution difference between the front and rear wheels based on the determined revolution rate; and a torque allocating unit for allocating the engine power responsive to the calculated revolution rate difference between the front and rear wheels.

4. A vehicle drive torque allocating device as defined in claim 3, wherein the threshold value selecting unit further includes a switch to indicate a vehicle starting operation, wherein the threshold value selecting unit, responsive to the start indicative signal, sets the revolution rate for each of the wheels to the lowest value when the detected revolution rate exceeds a third threshold value.

\* \* \* \* \*